(12) United States Patent
Sprague

(10) Patent No.: US 10,136,613 B2
(45) Date of Patent: Nov. 27, 2018

(54) ANIMAL LITTER CONTAINER ENCLOSURE SYSTEM

(71) Applicant: Mark Sprague, Bloomington, IL (US)

(72) Inventor: Mark Sprague, Bloomington, IL (US)

(*) Notice: Subject to any disclaimer, the term of this patent is extended or adjusted under 35 U.S.C. 154(b) by 0 days.

(21) Appl. No.: 15/731,713

(22) Filed: Jul. 21, 2017

(65) Prior Publication Data
US 2017/0367296 A1 Dec. 28, 2017

Related U.S. Application Data

(62) Division of application No. 14/690,234, filed on Apr. 17, 2015.

(51) Int. Cl.
*A01K 1/01* (2006.01)

(52) U.S. Cl.
CPC .................. *A01K 1/0107* (2013.01)

(58) Field of Classification Search
CPC .............................. A01K 1/0107; A01K 1/015
See application file for complete search history.

(56) References Cited

U.S. PATENT DOCUMENTS

| | | | |
|---|---|---|---|
| 3,467,163 A | 9/1969 | Vassaux | |
| 3,618,568 A | 11/1971 | Breeden | |
| 4,021,975 A | 5/1977 | Calkins | |
| 4,489,706 A * | 12/1984 | Hait | F24C 1/16 126/1 D |
| 5,058,528 A | 10/1991 | Counseller et al. | |
| 5,134,972 A * | 8/1992 | Compagnucci | A01K 1/0107 119/165 |
| 5,148,768 A * | 9/1992 | Hinton | A01K 1/0107 119/482 |
| 5,195,457 A | 3/1993 | Namanny | |
| 5,975,017 A | 11/1999 | Cameron | |
| 6,142,596 A | 11/2000 | Carson | |
| 6,237,534 B1 * | 5/2001 | Schwartz | A01K 1/0107 119/165 |
| 6,267,113 B1 * | 7/2001 | Maust | F24B 1/1808 126/512 |
| 6,394,035 B1 | 5/2002 | Hill | |
| 6,439,161 B1 | 8/2002 | Clemmons | |

(Continued)

FOREIGN PATENT DOCUMENTS

CA 2192421 A1 * 6/1998 ............. A01K 1/015

OTHER PUBLICATIONS

The Graphic Studio, Litter-Garage Brochure, created Mar. 5, 2008.

*Primary Examiner* — Monica L Williams

(57) ABSTRACT

An animal litter container enclosure system includes an access chute, a housing, and a drawer. The access chute has a first access, a second access, and an exterior surface, and is configured to be inserted through a wall between a first space and a second space such that the first access is located in the first space and the second access is located in the second space. The housing has a back access aperture; an interior top surface adjacent the back access aperture, a mounting flange adjacent the back access aperture, a front wall with a front wall exterior surface, and a front drawer aperture. The housing is configured to be mounted to the wall in the second space through attaching the mounting flange to the wall and resting the interior top surface on the exterior surface of the access chute.

8 Claims, 7 Drawing Sheets

(56) References Cited

U.S. PATENT DOCUMENTS

| | | |
|---|---|---|
| 7,530,331 B1 | 5/2009 | Malachowski |
| 8,881,680 B1 | 11/2014 | Woody |
| 2003/0168017 A1 | 9/2003 | Perelli et al. |
| 2006/0037548 A1* | 2/2006 | Mohr .................. A01K 1/0107 119/166 |
| 2013/0160381 A1 | 6/2013 | Sommer |
| 2016/0302379 A1 | 10/2016 | Sprague |

* cited by examiner

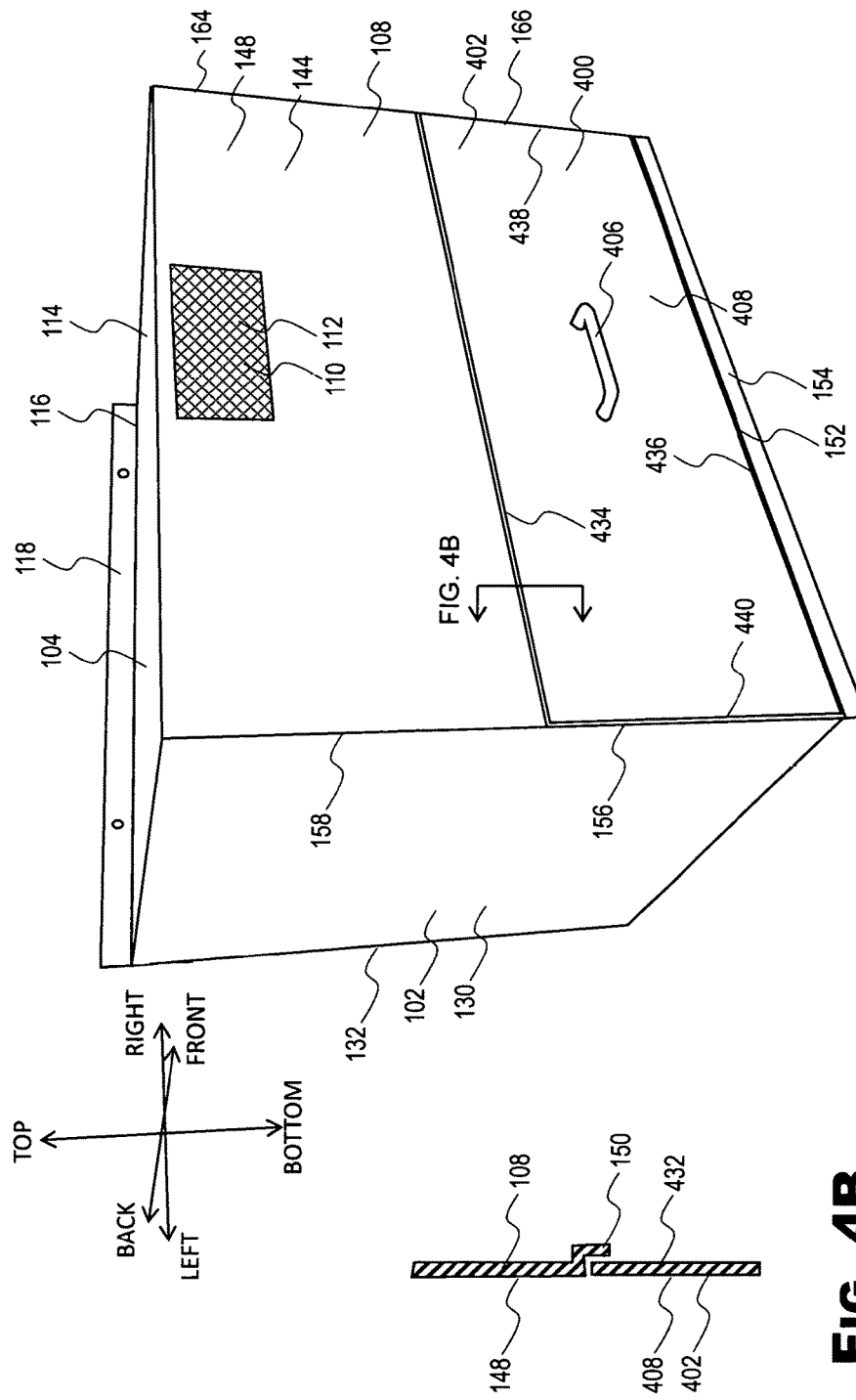

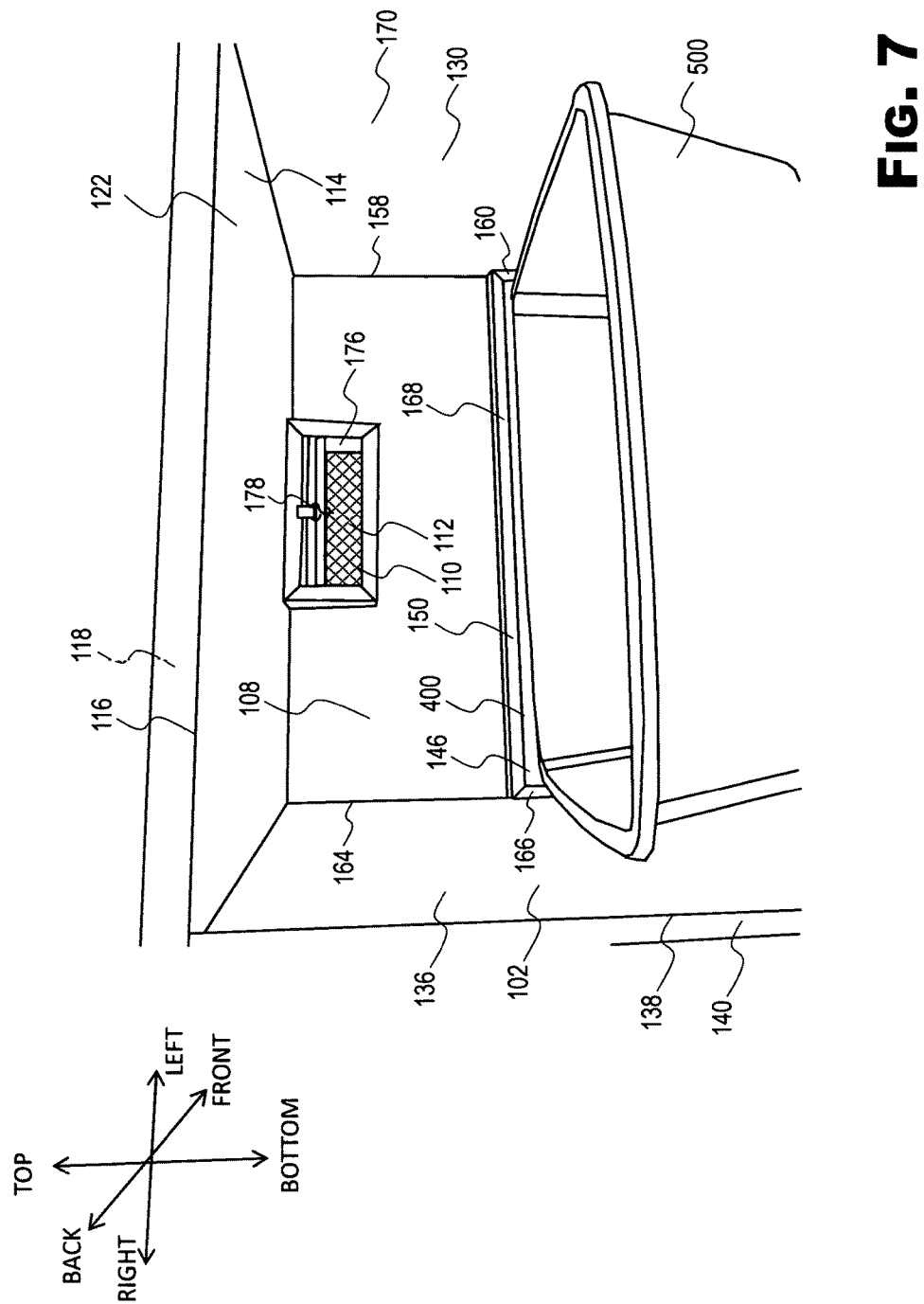

ANIMAL LITTER CONTAINER ENCLOSURE SYSTEM

CROSS REFERENCE TO RELATED APPLICATIONS

This patent application is a Divisional of U.S. patent application Ser. No. 14/690,234 filed Apr. 17, 2015, entitled "ANIMAL LITTER CONTAINER ENCLOSURE SYSTEM", which is incorporated by reference herein in its entirety.

TECHNICAL FIELD

The present invention generally pertains to structures. More particularly, the present invention pertains to structures that enclose animal litter containers and/or other animal waste disposal devices.

BACKGROUND

An animal litter container is used to hold an absorbent material, commonly referred to as kitty litter, for the disposal of animal feces and urine. The container is typically placed in some out of the way location a dwelling, such as a laundry room or closet. A better solution to the litter container exposure problem is to locate the litter container outside the dwelling with direct access for the animal and a safe environment for the animal while present in the litter container. The exterior location may be within the confines of another building, such as an attached garage, or may be completely outside and exposed to the weather. Based on these requirements, an enclosure is needed to provide access by the animal, to create a safe environment, to prevent the animal from leaving the safety of the dwelling, and to keep the litter container out of the weather. The enclosure must also prevent litter container access to pests, such as rodents or insects and provide a convenient means for removing contaminated kitty litter and refilling the container with fresh kitty litter. The enclosure may also need to comply with building, fire, safety or other codes or requirement. It may be desired that the enclosure be an attractive addition to the environment. An animal litter container enclosure is needed to meet these and/or other objectives.

SUMMARY OF THE INVENTION

In one aspect of the present invention, an animal litter container enclosure system includes an access chute, a housing, and a drawer. The access chute has a first access, a second access, and an exterior surface, and is configured to be inserted through a wall between a first space and a second space such that the first access is located in the first space and the second access is located in the second space. The housing has a back access aperture; an interior top surface adjacent the back access aperture, a mounting flange adjacent the back access aperture, a front wall with a front wall exterior surface, and a front drawer aperture. The housing is configured to be mounted to the wall in the second space through attaching the mounting flange to the wall and resting the interior top surface on the exterior surface of the access chute. The drawer is slidingly connected to the housing to move between an open position and a closed position. The drawer includes a drawer tray configured to support a litter container and a drawer front with a drawer front surface. When the drawer is in the open position, the litter container may be removed, inserted, and/or cleaned. When the drawer is in the closed position, the litter container is enclosed by the housing, and the front wall exterior surface is substantially planar with the drawer front surface.

In another aspect of the present invention, an animal litter container enclosure system includes a substantially rectangular housing formed of sheet metal, a fire damper, and a drawer slidingly connected to the housing to move between an open position and a closed position. The housing has a back, a front, an access aperture in the back, mounting means for mounting the back against a wall, a drawer aperture in the front, an interior, and a screen aperture. The fire damper is mounted in the interior the behind the screen aperture. The drawer is formed substantially of sheet metal, and has a drawer tray configured to support a litter container, and a drawer front. When the drawer is in the open position, the litter container may be removed, inserted, and/or cleaned. When the drawer is in the closed position the litter container is completely enclosed by the housing, the drawer front, and the wall.

In another aspect of the present invention, an animal litter container enclosure system includes an access chute, a housing, and a drawer. The access chute has a first access, a second access, and an exterior surface and is configured to be inserted through a wall between a first space and a second space such that the first access is located in the first space and the second access is located in the second space. The housing has a back access aperture for mounting on the wall in the second space such that the access chute extends through the back access aperture and the second access is within the housing. The housing also has a bottom wall, a front wall with a front wall exterior surface, and a front drawer aperture. The drawer has a drawer tray and a drawer front with a drawer front surface. The drawer tray has a lower surface. The drawer is slidingly connected to the housing through drawer slides to move between an open position and a closed position. The drawer slides are fixedly connected to the housing bottom wall and the tray lower surface. The drawer tray is configured to support a litter container below the second access. When the drawer is in the open position, the litter container may be removed, inserted, and/or cleaned. When the drawer is in the closed position, the litter container is enclosed by the housing, and the front wall exterior surface is substantially planar with the drawer front surface.

BRIEF DESCRIPTION OF THE DRAWINGS

FIG. 4A is a left front perspective view of a housing and a drawer, with the drawer in a closed position, according to an exemplary embodiment of the invention.

FIG. 4B is a cross section of the housing and drawer of FIG. 4A at the arrowed line marked 4B.

FIG. 7 is a back perspective view of a portion of the housing, drawer, animal litter container, and fire damper; with the drawer in a closed position, according to an exemplary embodiment of the invention.

DETAILED DESCRIPTION

While the system is described with reference to several illustrative embodiments described herein, it should be clear that the present invention should not be limited to such embodiments. Therefore, the description of the embodiments provided herein is illustrative of the present invention and should not limit the scope of the invention. In addition, while the following description references drawings showing particular configurations and proportions, it will be appreciated that the invention may be configured to have other configurations and proportions.

The description may use perspective-based descriptions such as up/down, back/front, and top/bottom. Such descriptions are merely used to facilitate the discussion and are not intended to restrict the application of embodiments of the present invention.

Figure 1:
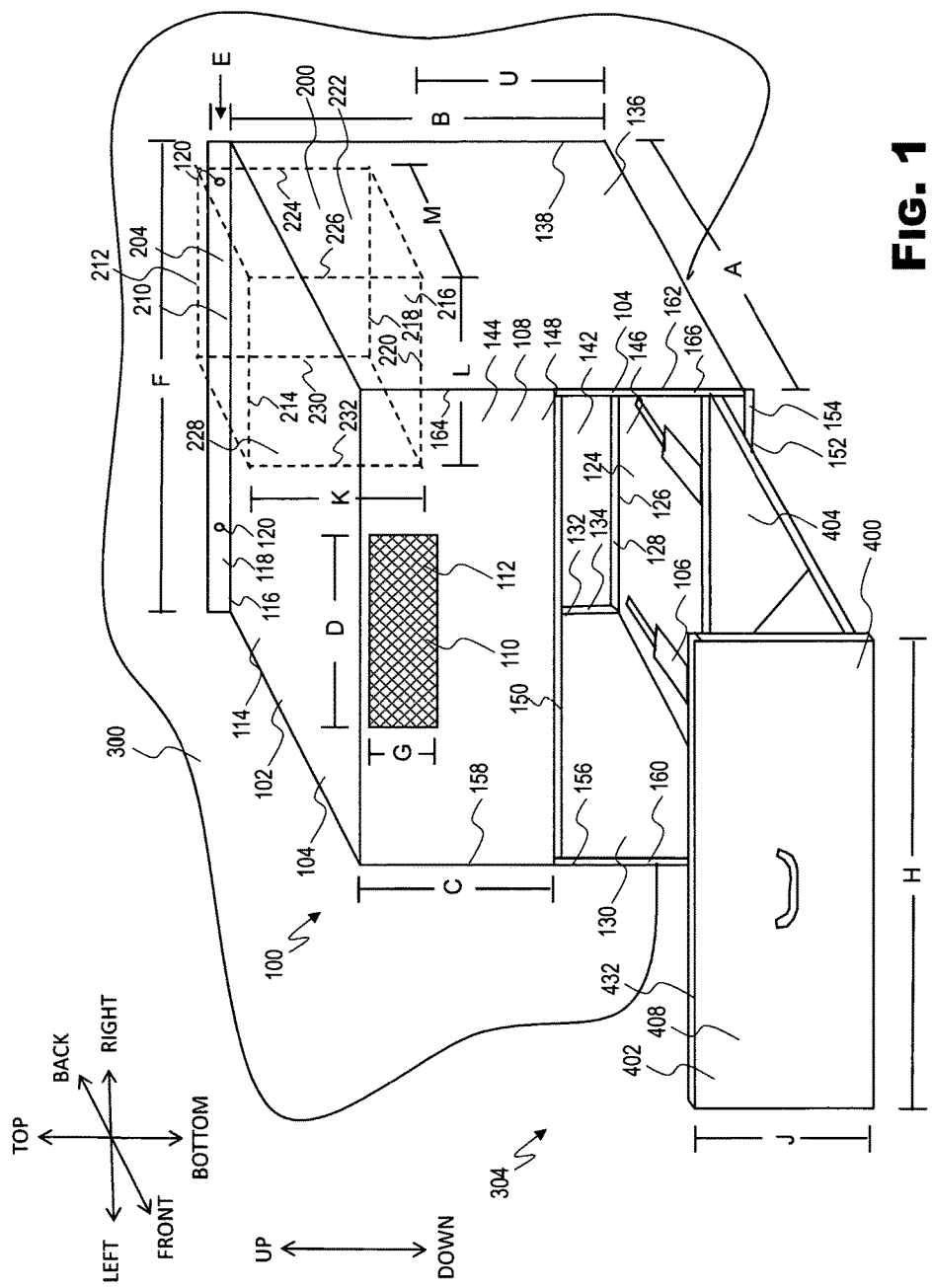
FIG. 1 is a right front perspective view of an animal littler container enclosure system, with a drawer in an open position, according to an exemplary embodiment of the invention.

Referring now to FIG. 1, an exemplary embodiment of an animal litter container enclosure system 100 is illustrated. The system 100 includes an access chute 200, a housing 102, and a drawer 400. The access chute 200 has a first access 206, a second access 208, and an exterior surface 204, and is configured to be inserted through a wall 300 between a first space 302 (shown and described in relation to FIG. 2) and a second space 304 such that the first access 206 is located in the first space 302 and the second access 208 is located in the second space 304. The housing 102 has a back access aperture 142; an interior top surface 122 (shown in relation to FIG. 5) adjacent the back access aperture 142, a mounting flange 118 adjacent the back access aperture 142, a front wall 108 with a front wall exterior surface 148, and a front drawer aperture 146. The housing 102 is configured to be mounted to the wall 300 in the second space 304 through attaching the mounting flange 118 to the wall 300 and resting the interior top surface 122 on the exterior surface 204 of the access chute 200. The drawer 400 is slidingly connected to the housing 102 to move between an open position and a closed position (shown in FIG. 1 in the open position, shown in FIG. 48 in the closed position). The drawer 400 includes a drawer tray 404 configured to support a litter container 500 (shown and described in relation to FIG. 6) and a drawer front 402 with a drawer front surface 408. When the drawer 400 is in the open position, the litter container 500 may be removed, inserted, and/or cleaned. When the drawer 400 is in the closed position, the litter container 500 is enclosed by the housing 102, and the front wall exterior surface 148 is substantially planar with the drawer front surface 408.

The housing 102 may have a substantially rectangular shape and include a housing front 144, a front wall 108, a top wall 114, a bottom wall 124, a left wall 130, and a right wall 136. In other embodiments, the housing 102 may have other shapes. The housing 102 may include a housing exterior 104 and a housing interior 170. The front wall 108 may include a front wall exterior surface 148 and a front wall bottom edge 150. The front wall bottom edge 150 may be recessed from the front wall exterior surface 148 as is shown more clearly in FIG. 4B. The front wall 108 may include a screen aperture 110 with a screen 112. The screen aperture 110 may allow ventilation in the housing interior 170. The screen 112 may prevent bugs, rodents, or other vermin from entering the housing 102 from the second space 304. The front wall 108 may have a width F (which may be in the range of twenty-one to twenty-six inches (21"-26"), for example twenty-three and a half inches (23.5")), and a height C (which may be in the range of seven to eleven inches (7"-11"), for example nine inches (9")). The screen aperture 110 may have a width D (which may be in the range of four to nine inches (4"-9"), for example six and a half inches (6.5")), and a height G (which may be in the range of two to four inches (2"-4"), for example three inches (3")).

The top wall 114 may include the interior top surface 122 and a top wall back edge 116. The mounting flange 118 may extend perpendicularly and up from the top wall 114 at the top wall back edge 116. The top wall 114 may have a width F, and a depth A (which may be in the range of thirteen to eighteen inches (13"-18"), for example fifteen and a half inches (15.5")). The mounting flange 118 may have a width E (which may be in the range of one half to two inches (0.5"-2"), for example one inch (1")), and a length F. The mounting flange 118 may include mounting holes 120 for mounting the housing 102 to the wall 300.

The bottom wall 124 may include a bottom wall back edge 126 and a bottom wall front edge 152. A bottom wall back edge flange 128 may extend perpendicularly and up from the bottom wall 124 at the bottom wall back edge 126. A bottom wall front edge flange 154 may extend perpendicularly and down from the bottom wall 124 at the bottom wall front edge 152. The bottom wall 124 may have a width F, and a depth A. The bottom wall back edge flange 128 may have a width in the range of one quarter to three quarters of an inch (0.25"-0.75"), for example half an inch (0.5"). The bottom wall front edge flange 154 may have a width in the range of one quarter to three quarters of an inch (0.25"-0.75"), for example half an inch (0.5").

The left wall 130 may include a left wall back edge 132, a left wall bottom front edge 156, and a left wall top front edge 158. A left wall back edge flange 134 may extend perpendicularly and to the right of the left wall 130, at the left wall back edge 132. A left wall front flange 160 may extend perpendicularly and to the right of the left wall 130, at a recessed distance from the left wall bottom front edge 156. The recessed distance may, for example, be in the range of one quarter to three quarters of an inch (0.25"-0.75"), for example half an inch (0.5"). The left wall top front edge 158 may be fixedly connected with the front wall 108. The left wall 130 may have a height B (which may be in the range of fifteen to nineteen inches (15"-19"), for example seventeen inches (17")), and a depth A. The left wall back edge flange 134 may have a width in the range of one quarter to three quarters of an inch (0.25"-0.75"), for example half an inch (0.5"). The left wall front flange 160 may have a width in the range of one quarter to three quarters of an inch (0.25"-0.75"), for example half an inch (0.5"). The left wall top front edge 158 may have a height C. The left wall bottom front edge 156 may have a height U (which may be in the range of six to ten inches (6"-10"), for example eight inches (8")).

The right wall 136 may include a right wall back edge 138, a right wall bottom front edge 162, and a right wall top front edge 164. A right wall back edge flange 140 may extend perpendicularly and to the left of the right wall 136, at the right wall back edge 138. A right wall front flange 166 may extend perpendicularly and to the left of the right wall 136, at a recessed distance from the right wall bottom front edge 162. The recessed distance may, for example, be in the range of one quarter to three quarters of an inch (0.25"-0.75"), for example half an inch (0.5"). The right wall top front edge 164 may be fixedly connected with the front wall 108. The right wall 136 may have a height B, and a depth A. The right wall back edge flange 140 may have a width in the range of one quarter to three quarters of an inch (0.25"-0.75"), for example half an inch (0.5"). The right wall front flange 166 may have a width in the range of one quarter to three quarters of an inch (0.25"-0.75"), for example half an inch (0.5"). The right wall top front edge 164 may have a height C. The right wall bottom front edge 162 may have a height U.

An edge of the bottom wall 124 may be perpendicularly and fixedly attached to an edge of the left wall 130 and an edge of the right wall 136. An edge of the top wall 114 may be perpendicularly and fixedly attached to an edge of the left wall 130 and an edge of the right wall 136. An edge of the top wall 114 may be perpendicularly and fixedly attached to an edge of the front wall 108. The top wall back edge, the bottom wall back edge flange 128, the left wall back edge flange 134, and the right wall back edge flange 140 may frame the back access aperture 142. The bottom wall front edge 152, the left wall front flange 160, the right wall front flange 166, and the front wall bottom edge 150 may form a recessed frame 168 around the front drawer aperture 146.

The housing 102 may be formed entirely or partially of sheet metal, which may be steel, and may be twenty (20) gauge sheet metal or thirty two hundredths of an inch (0.32") thick sheet metal. The sheet metal may be bent from a single piece and welded, riveted, or fastened in another manner as known in the art to form the housing 102. Alternatively, multiple pieces of sheet metal may be bent and/or welded, riveted, or otherwise fastened to form the housing 102. In other embodiments, other methods of forming sheet metal into a desired form, as known in the art, may be used. The housing exterior 104 may wholly or in part be covered with a powder coating such as a powdered paint.

The access chute 200 may be generally rectangular in shape and include a top wall 212, a bottom wall 216, a right side wall 222, and a left side wall 228. The top wall 212 may include a top wall back edge 212, a top wall front edge 214, and a top exterior surface 234 (shown in FIG. 2). The bottom wall 216 may include a bottom wall back edge 218, a bottom wall front edge 220, and a bottom interior surface 236 (shown in FIG. 2). The right side wall 222 may include a right side wall back edge 224, and a right side wall front edge 226. The left side wall 228 may include a left side wall back edge 230, and a left side wall front edge 232. The top wall back edge 212, the bottom wall front edge 218, the right side wall back edge 224, and the left side wall back edge 230 may frame the first access 206. The top wall front edge 214, the bottom wall front edge 220, the right side wall front edge 226, and the left side wall front edge 232 may frame the second access 208.

The access chute 200 may have a width L (which may be in the range of seven to twelve inches (7"-11"), for example nine inches (9")). The access chute 200 may have a height K (which may be in the range of seven to eleven inches (7"-12), for example nine and a half inches (9.5")). The access chute 200 may have a depth M (which may be in the range of six to ten inches (6"-10"), for example eight inches (8")).

Figure 2A:
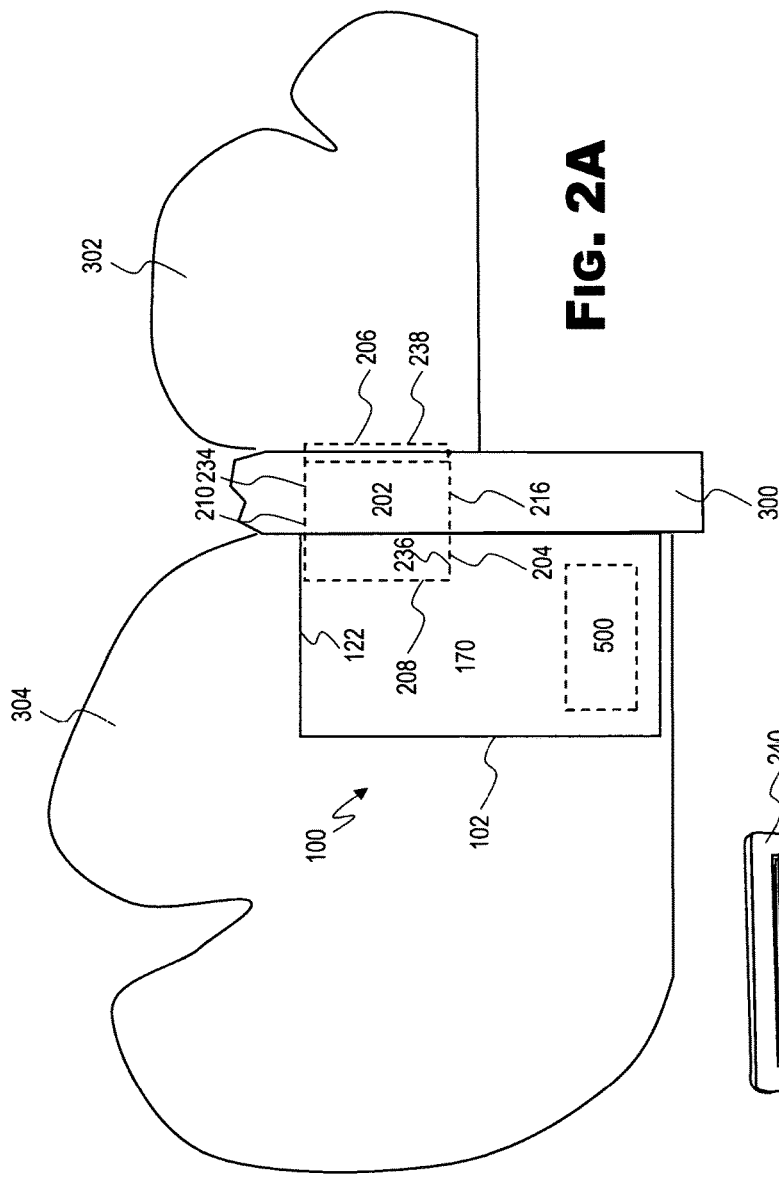
FIG. 2A is a schematic exemplifying a side view of the animal littler container enclosure system of FIG. 1 in an exemplary environment.

Referring now to FIG. 2A, a schematic exemplifying side view of the system 100 is illustrated. In the illustration the drawer 400 is closed and supporting the litter container 500. The access chute 200 may include an interior surface 202 and an exterior surface 204. The interior surface 202 may include the bottom interior surface 236, and the exterior surface 204 may include the top exterior surface 234. The access chute 200 may be inserted through the wall 300 such that it extends from the first space 302 into the housing interior 170. Part of the interior top surface 122 of the housing 102 may rest on the top exterior surface 234, such that the access chute 200 at least partially supports the weight of the housing 102 when it is mounted on the wall 300. An animal access door 238 may be mounted on the wall 300 in the first space 302 covering the first access 206 of the access chute 200.

Figure 2B:
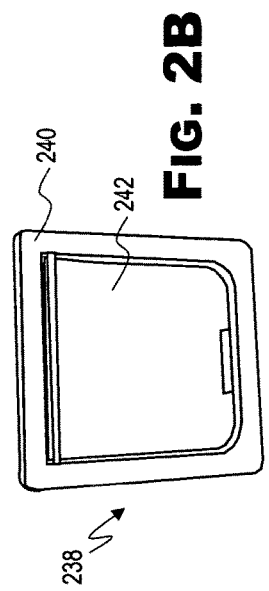
FIG. 2B is a front view of an exemplary animal access door according to an exemplary embodiment of the invention.

Referring now to FIG. 2B, an exemplary animal access door 238 is illustrated. The access door 238 may include a frame 240 and a door 242 rotatably connected to the frame 240. The access door 238 may be similar to the animal access doors commercially available for animal access into a house or garage. For example, the access door may include the Cat Mate® Large Cat Flap which is commercially available.

An animal (not shown) may enter the access chute through the animal access door 238 at the first access 206 in the first space 302, move along the bottom interior surface 236, enter the housing interior 170 through the second access 208, and have access to the animal litter container 500. When the animal is through using the animal litter container 500, the animal may enter the access chute 200 through the second access 208, move along the bottom interior surface 236, and exit the access chute 200 into the first space 302 through the animal access door 238 at the first access 206. This keeps animal waste and the animal litter container out of the first space 302 which might be a dwelling. The second space 304 may be a garage, a shed, or other space where it is convenient to keep the animal litter container 500. The animal litter container 500 may be accessed and cleaned in the second space 304, negating the need to have animal waste in a dwelling.

The access chute 200 may be formed entirely or partially of wood, which may be plywood, for example half inch (½") birch plywood. Multiple pieces of plywood may be glued, nailed, screwed, or otherwise fastened, as known in the art, to form the access chute 200.

Referring back now to FIG. 1, the drawer 400 is slidingly connected to the housing 102 to move between an open position and a closed position (shown in FIG. 1 in the open position, shown in FIG. 4B in the closed position). The drawer 400 includes a drawer tray 404 configured to support a litter container 500 (shown and described in relation to FIG. 6) and a drawer front 402 with a drawer front surface 408.

Figure 3A:
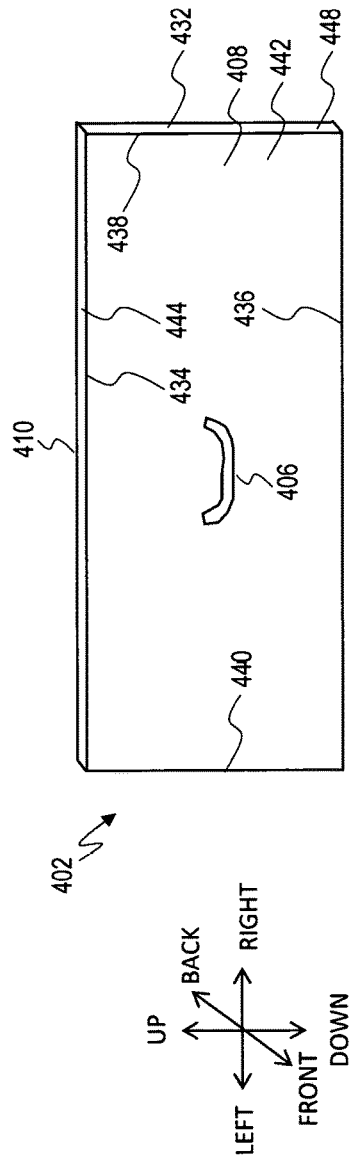
FIG. 3A is a front perspective view of a drawer front according to an exemplary embodiment of the invention.
Figure 3B:
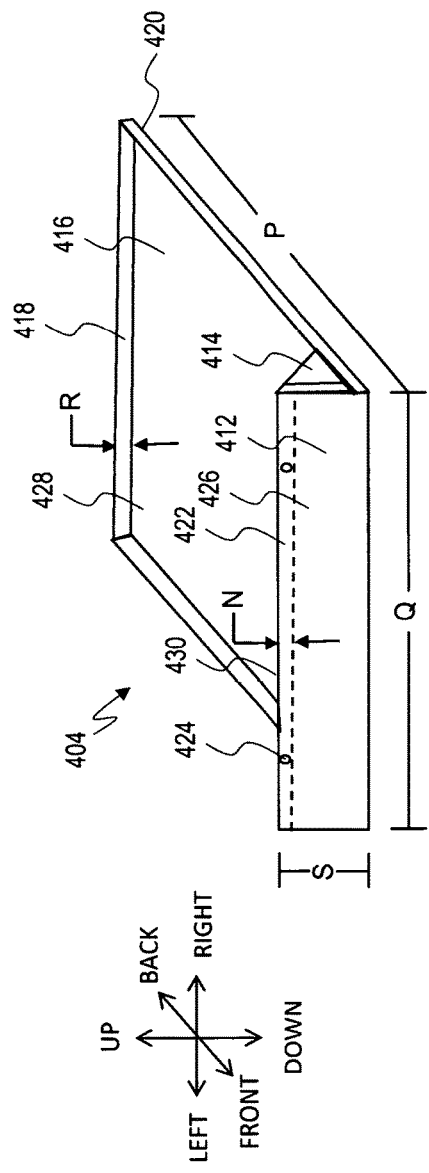
FIG. 3B is a front right perspective view of a drawer tray according to an exemplary embodiment of the invention.

The drawer tray 404 may include a tray bottom 416 (shown in FIG. 3B) with a lower surface 420 (shown in FIG. 3B). The drawer 400 may be slidingly connected to the housing with drawer slides 106. In one embodiment, the drawer slides 106 may include metal ball bearing drawer tracks. The drawer slides 106 may be fixedly connected to the bottom interior surface 236 and the lower surface 420. The drawer front 402 may include a front surface 408 and a drawer flange 432. The drawer front 402 may have a width H (which may be in the range of twenty-one to twenty-six inches (21"-26"), for example twenty-three and a quarter inches (23.25")), and a length J (which may be in the range of six to ten inches (6"-10"), for example seven and three quarters inches (7.75")). The drawer flange 432 may have a width in the range of one quarter to three quarters of an inch (0.25"-0.75"), for example half an inch (0.5").

The drawer flange 432 width may be the same dimension as the distance the frame 168 is recessed from the front wall exterior surface 148, such that when the drawer 400 is in the closed position, the drawer front surface 408 is planar with the front wall exterior surface 148. The drawer 400 may be formed entirely or partially of sheet metal, which may be steel, and may be twenty (20) gauge sheet metal or thirty two hundredths of an inch (0.32") thick sheet metal.

Referring now to FIG. 3A, an exemplary embodiment of the drawer front 402 is illustrated. The drawer front 402 may include a panel 442 with a drawer front surface 408 and a back surface 410, and a handle 406 fixedly attached to the panel 442. The panel 442 may include a top edge 434, a bottom edge 436, a right edge 438, and a left edge 440.

A top edge flange 444 may extend perpendicularly from the panel 442, and back from the top edge 434. The top edge flange 444 may have a width in the range of one quarter to three quarters of an inch (0.25"-0.75"), for example half an inch (0.5"). A bottom edge flange 446 (shown in FIG. 5) may extend perpendicularly to the panel 442, and back from the bottom edge 436. The back edge flange 446 may have a width in the range of one quarter to three quarters of an inch (0.25"-0.75"), for example half an inch (0.5"). A right edge flange 448 may extend perpendicularly to the panel 442, and back from the right edge 438. The right edge flange 448 may have a width in the range of one quarter to three quarters of an inch (0.25"-0.75"), for example half an inch (0.5"). A left edge flange 450 (shown in FIG. 6) may extend perpendicularly to the panel 442, and back from the left edge 440. The left edge flange 450 may have a width in the range of one quarter to three quarters of an inch (0.25%"-0.75"), for example half an inch (0.5"). The drawer flange 432 may include the top edge flange 444, the bottom edge flange 446, the right edge flange 448, and the left edge flange 450. In some exemplary embodiment, the panel 442 and drawer flange 432 may be form from a single piece of sheet metal, or multiple pieces of sheet metal welded or otherwise fixedly attached to each other.

Referring now to FIG. 3B, an exemplary embodiment of the drawer tray 404 is illustrated. The drawer tray 404 may include a front panel 412, a panel support 414, the tray bottom 416, and a rim 418. In addition to the lower surface 420, the tray bottom may include an upper surface 428. The front panel 412 may include a reinforcement 422, one or more mounting holes 424, a front surface 426, and a back surface 430. The reinforcement 422 may have a width N (which may be in the range of one quarter to three quarters of an inch (0.25"-0.75"), for example half an inch (0.5")). The reinforcement 422 may be formed through folding over sheet metal which may form the front panel 412 in a hem, as is known in the art. The front panel 412 may have a width Q (which may be in the range of sixteen to twenty-one inches (16"-21"), for example eighteen and a half inches (18.5")). The front panel 412 may have a height S (which may be in the range of three to five inches (3"-5"), for example four inches (4")). The tray bottom 416 may have a width Q, and a length P (which may be in the range of twelve to seventeen inches (12"-17"), for example fourteen and three quarters inches (14.75")). The rim 418 may have a height R (which may be in the range of one quarter to three quarters of an inch (0.25"-0.75"), for example half an inch (0.5")).

The rim 418 may be a flange which extends perpendicularly to the tray bottom and up from edges of the perimeter of the tray bottom 416 on three sides. In other embodiments, the rim 418 may be three sides of the drawer 404. The drawer tray 404 may be formed from sheet metal. In one embodiment a single piece of sheet metal may be cut and bent to form the drawer tray. In other embodiments multiple sheets of metal may be cut and/or bent, and welded or fixedly attached in another way to form the drawer tray 404, as is known in the art. The drawer tray 404 may be fixedly attached to the drawer front 402 through fixedly attaching the back surface 410 of the drawer front 402, to the front surface 426 of the drawer tray 404. The mounting holes 424 may be used to attach the drawer front 402 to the drawer tray 404.

Referring now to FIG. 4A, an exemplary embodiment of the housing 102 and drawer 400, with the drawer 400 in the closed position, is illustrated. When the drawer 400 is closed the drawer front 402 may be positioned in a recess in the housing front 144 formed by the recessed front wall bottom edge 150, the left wall bottom front edge 156, the right wall bottom front edge 162, the front of the bottom wall 124, and the frame 168. When the drawer 400 is in the closed position, the housing interior 170 may be bug and rodent free. In some embodiments the interface between the drawer front 402 and the housing 102 may include a seal (not shown).

Referring now to FIG. 4B, a cross section at arrowed line 4B in FIG. 4A is shown. The cross section depiction shown the drawer front recessed from the housing front 144. Although a space is shown between the housing 102 and the drawer front 402, many embodiments will not have a detectable space between the housing 102 and the drawer front 402.

Figure 5:
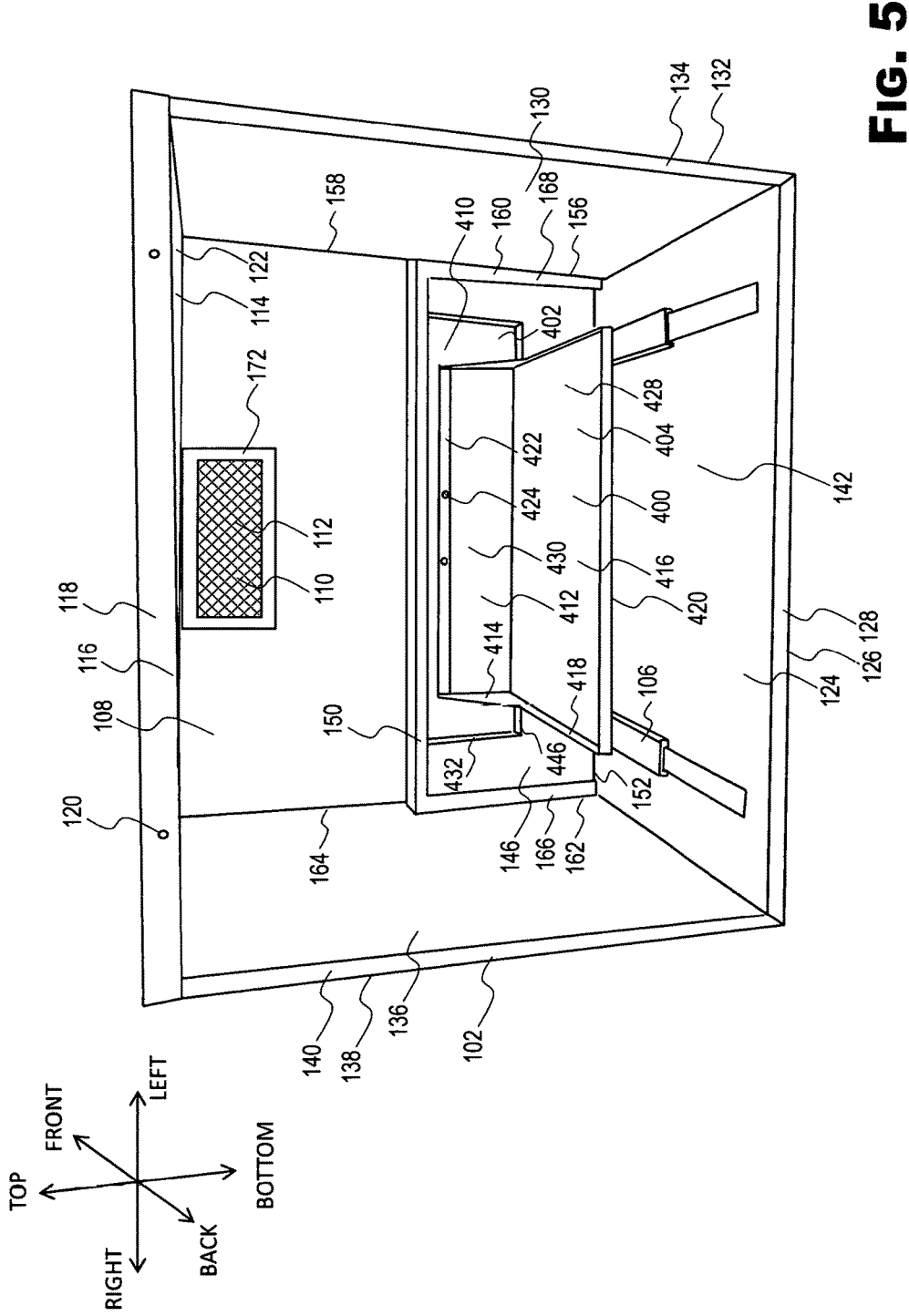
FIG. 5 is a back perspective view of a housing and drawer, with the drawer in an open position, according to an exemplary embodiment of the invention.

Referring now to FIG. 5, a back perspective view of the housing 102 and drawer 400 is illustrated. The housing 102 may include a screen fastener 172 fixedly attached to the front wall 108. The screen fastener 172 may be a metal frame welded to the front wall 108 around the screen aperture 110 to fix the screen 112 in place in the screen aperture 110.

Figure 6:
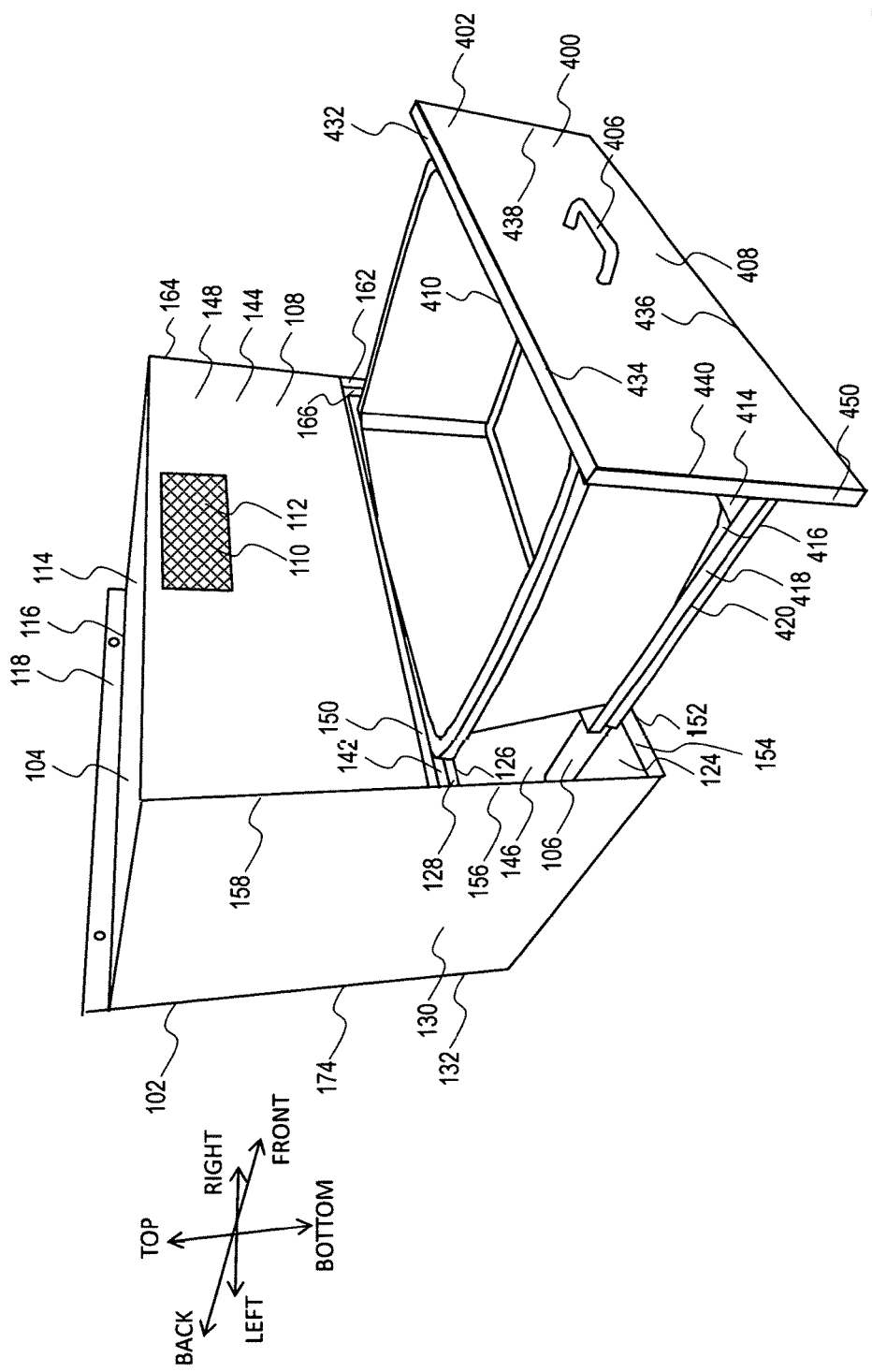
FIG. 6 is a left front perspective view of a housing, drawer, and animal litter container, with the drawer in an open position, according to an exemplary embodiment of the invention.

Referring now to FIG. 6, a front left perspective view of the housing 102 and the drawer 400 is illustrated with the drawer tray 404 supporting a litter container 500, and with the drawer 400 in the open position.

Referring now to FIG. 7, a back perspective view of a portion of the housing 102, a fire damper 176, the drawer 400, and the animal litter container 500; with the drawer 400 in the closed position is illustrated. The fire damper 176 may be a UL approved fire damper and may include a heat activated heat link 178. The fire damper 176 may be mounted in the housing interior 170 directly behind the screen aperture 110. If a fire breaks out in the second space 304, the heat link 178 may release a damper when the fire raises the temperature to a predetermined level. This may prevent the fire from spreading into the first space 302 through the screen aperture 110. The fire damper 176 may be needed for the system 100 to be in compliance with fire or other codes in some areas and regions.

In some embodiments, the system 100 includes the housing 102 which may be substantially rectangular and formed of sheet metal, the fire damper 176, and the drawer 400 slidingly connected to the housing 102 to move between an open position and a closed position. The housing 102 includes a housing back 174, the housing front 144, the access aperture 142 in the housing back 174, mounting means for mounting the housing back 174 against the wall 300, the front drawer aperture 146 in the housing front 144, the housing interior 170, and the screen aperture 110. The fire damper 176 is mounted in the housing interior 176 behind the screen aperture 110. The drawer 400 is formed substantially of sheet metal, and includes the drawer tray 404 configured to support the litter container 500, and the drawer front 402. When the drawer 400 is in the open position, the litter container 500 may be removed, inserted, and/or cleaned. When the drawer 400 is in the closed position the litter container 500 is completely enclosed by the housing 102, the drawer front 402, and the wall 300.

In some embodiments the system 100 includes the access chute 200, the housing 102, and the drawer 400. The access chute 200 has the first access 206, the second access 208, and the exterior surface 204 and Is configured to be inserted through the wall 300 between the first space 302 and the second space 304 such that the first access 206 is located in the first space 302 and the second access 208 is located in the second space 304. The housing 102 has the back access aperture 142 for mounting on the wall 300 in the second space 304 such that the access chute 200 extends through the back access aperture 142 and the second access 208 is within the housing 102. The housing 102 includes the bottom wall 124, the front wall 108 with the front wall exterior surface 148, and the front drawer aperture 146. The drawer 400 includes the drawer tray 404 and the drawer front 402 with the drawer front surface 426. The drawer tray 404 includes the lower surface 420. The drawer 400 is slidingly connected to the housing 102 through the drawer slides 106 to move between the open position and the closed position. The drawer slides 106 are fixedly connected to the housing bottom wall 124 and the tray lower surface 420. The drawer tray 404 is configured to support the litter container 500 below the second access 208. When the drawer 400 is in the open position, the litter container 500 may be removed, inserted, and/or cleaned. When the drawer 400 is in the closed position, the litter container 500 is enclosed by the housing 102, and the front wall exterior surface 148 is substantially planar with the drawer front surface 426.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. An animal litter container enclosure system, comprising:
   a substantially rectangular housing formed substantially of sheet metal and including a back, a front, an access aperture in the back, mounting means for mounting the back against a wall, a drawer aperture in the front, an interior, and a screen aperture;
   a fire damper including a heat activated heat link mounted in the interior the behind the screen aperture;
   a drawer slidingly connected to the housing to move between an open position and a closed position; the drawer formed substantially of sheet metal; the drawer including a drawer tray configured to support a litter container, and a drawer front; and
   wherein when the drawer is in the open position, the litter container may be removed, inserted, and/or cleaned; and
   wherein when the drawer is in the closed position the litter container is completely enclosed by the housing, the drawer front, and the wall.

2. The system of claim 1, wherein the drawer tray includes a front panel with a panel front surface, a tray bottom fixedly and perpendicularly connected to the front panel, and a rim fixedly and perpendicularly connected to the tray bottom.

3. The system of claim 2, wherein drawer front includes a back surface and the back surface is fixedly connected to the panel front surface.

4. The system of claim 1, wherein the housing includes a front wall with a front wall exterior surface, and a frame around the drawer aperture; and the frame is recessed from the front wall exterior surface.

5. The system of claim 4, wherein; the drawer front is substantially rectangular and includes a front surface, and edges; the edges including a top edge, a bottom edge, a right edge, and a left edge; the drawer front further including a flange protruding perpendicularly to the edges; the flange having a flange width; and
   the frame is recessed a distance substantially equal to the flange width.

6. The system of claim 1, wherein the drawer is slidingly connected to the housing with drawer slides.

7. The system of claim 6, wherein the housing includes a bottom wall, the drawer tray includes a tray bottom, and the drawer slides are fixedly connected to the bottom wall and the tray bottom.

8. The system of claim 1, wherein the drawer tray includes a front panel, and the front panel is fixedly connected to the drawer front.

* * * * *